United States Patent
Siefermann et al.

(10) Patent No.: US 8,909,418 B2
(45) Date of Patent: Dec. 9, 2014

(54) NETWORKING OF CONTROL DEVICES OF A MOTOR VEHICLE

(75) Inventors: Otmar Siefermann, Groebenzell (DE); Frank Wende, Unterhaching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1385 days.

(21) Appl. No.: 12/482,786

(22) Filed: Jun. 11, 2009

(65) Prior Publication Data

US 2009/0299548 A1 Dec. 3, 2009

Related U.S. Application Data

(63) Continuation of application No. PCT/EP2006/012035, filed on Dec. 14, 2006.

(51) Int. Cl.
| | |
|---|---|
| H04L 12/66 | (2006.01) |
| H04L 12/40 | (2006.01) |
| H04L 29/08 | (2006.01) |
| H04L 12/46 | (2006.01) |
| H04L 12/24 | (2006.01) |

(52) U.S. Cl.
CPC .......... *H04L 12/4625* (2013.01); *H04L 67/12* (2013.01); *H04L 12/66* (2013.01); *H04L 41/00* (2013.01); *H04L 12/24* (2013.01); *H04L 12/40097* (2013.01)
USPC ............... 701/36; 701/1; 370/254; 370/256; 370/257; 370/355; 370/362; 370/364; 370/365; 370/401; 370/402; 700/2; 700/8; 700/19; 700/20; 700/21

(58) Field of Classification Search
USPC ............. 701/1, 36; 326/62, 86; 370/254, 256, 370/257, 355, 362, 364, 365, 401, 402; 340/500, 1.1; 702/2, 8, 19–21
See application file for complete search history.

(56) References Cited

U.S. PATENT DOCUMENTS

| | | | |
|---|---|---|---|
| 4,627,052 | A | 12/1986 | Hoare et al. |
| 5,018,133 | A | 5/1991 | Tsukakoshi et al. |

(Continued)

FOREIGN PATENT DOCUMENTS

| | | | |
|---|---|---|---|
| DE | 38 38 945 A1 | 6/1989 | |
| DE | 41 10 372 A1 | 10/1991 | |
| DE | 101 31 923 A1 | 1/2002 | |

OTHER PUBLICATIONS

International Search Report dated Sep. 5, 2007 with English translation (six (6) pages).

*Primary Examiner* — Jack W Keith
*Assistant Examiner* — Chuong P Nguyen
(74) *Attorney, Agent, or Firm* — Crowell & Moring LLP

(57) ABSTRACT

Control devices in a motor vehicle, having first sequence-controlled control devices being connected to a first data bus and second sequence-controlled control devices being connected to a second data bus, are networked. A first control device sends a first message via the gateway device into the first and second data buses. At least a second control device receives the first message and checks whether the receiving of the first message is required for the corresponding control device. The second control device sends out a response message, which indicates whether the second control device has a corresponding need to receive the first message. In the event of such a need, a routing default is established and/or an existing routing default is changed in a gateway device.

12 Claims, 1 Drawing Sheet

(56) References Cited

U.S. PATENT DOCUMENTS

| | | | |
|---|---|---|---|
| 5,388,089 A * | 2/1995 | Odaka et al. | 370/401 |
| 5,588,002 A * | 12/1996 | Kawanishi et al. | 370/462 |
| 5,856,976 A * | 1/1999 | Hirano | 370/401 |
| 6,009,354 A * | 12/1999 | Flamme et al. | 700/184 |
| 6,141,710 A * | 10/2000 | Miesterfeld | 710/100 |
| 6,201,316 B1 * | 3/2001 | Knecht | 307/10.1 |
| 6,202,114 B1 | 3/2001 | Dutt et al. | |
| 6,484,082 B1 * | 11/2002 | Millsap et al. | 701/48 |
| 6,745,144 B2 * | 6/2004 | Froeschl et al. | 702/108 |
| 7,356,832 B1 * | 4/2008 | Eibach et al. | 726/2 |
| 7,802,016 B2 * | 9/2010 | Eimers-Klose et al. | 709/249 |
| 7,907,623 B2 * | 3/2011 | Ihle et al. | 370/402 |
| 7,917,261 B2 * | 3/2011 | Melman | 701/36 |
| 7,983,250 B2 * | 7/2011 | Enders et al. | 370/362 |
| 8,321,612 B2 * | 11/2012 | Hartwich et al. | 710/110 |
| 2001/0047228 A1 * | 11/2001 | Froeschl et al. | 701/1 |
| 2002/0003781 A1 | 1/2002 | Kikkawa et al. | |
| 2002/0108065 A1 * | 8/2002 | Mares | 713/300 |
| 2002/0116103 A1 * | 8/2002 | Matsunaga et al. | 701/29 |
| 2003/0117298 A1 * | 6/2003 | Tokunaga et al. | 340/989 |
| 2005/0113988 A1 * | 5/2005 | Nasr et al. | 701/22 |
| 2006/0083264 A1 * | 4/2006 | Jordan et al. | 370/503 |
| 2006/0190155 A1 * | 8/2006 | Meyer et al. | 701/54 |
| 2006/0287784 A1 * | 12/2006 | Kanki | 701/29 |
| 2009/0225766 A1 * | 9/2009 | Ihle et al. | 370/402 |
| 2009/0268744 A1 * | 10/2009 | Ihle et al. | 370/401 |

* cited by examiner

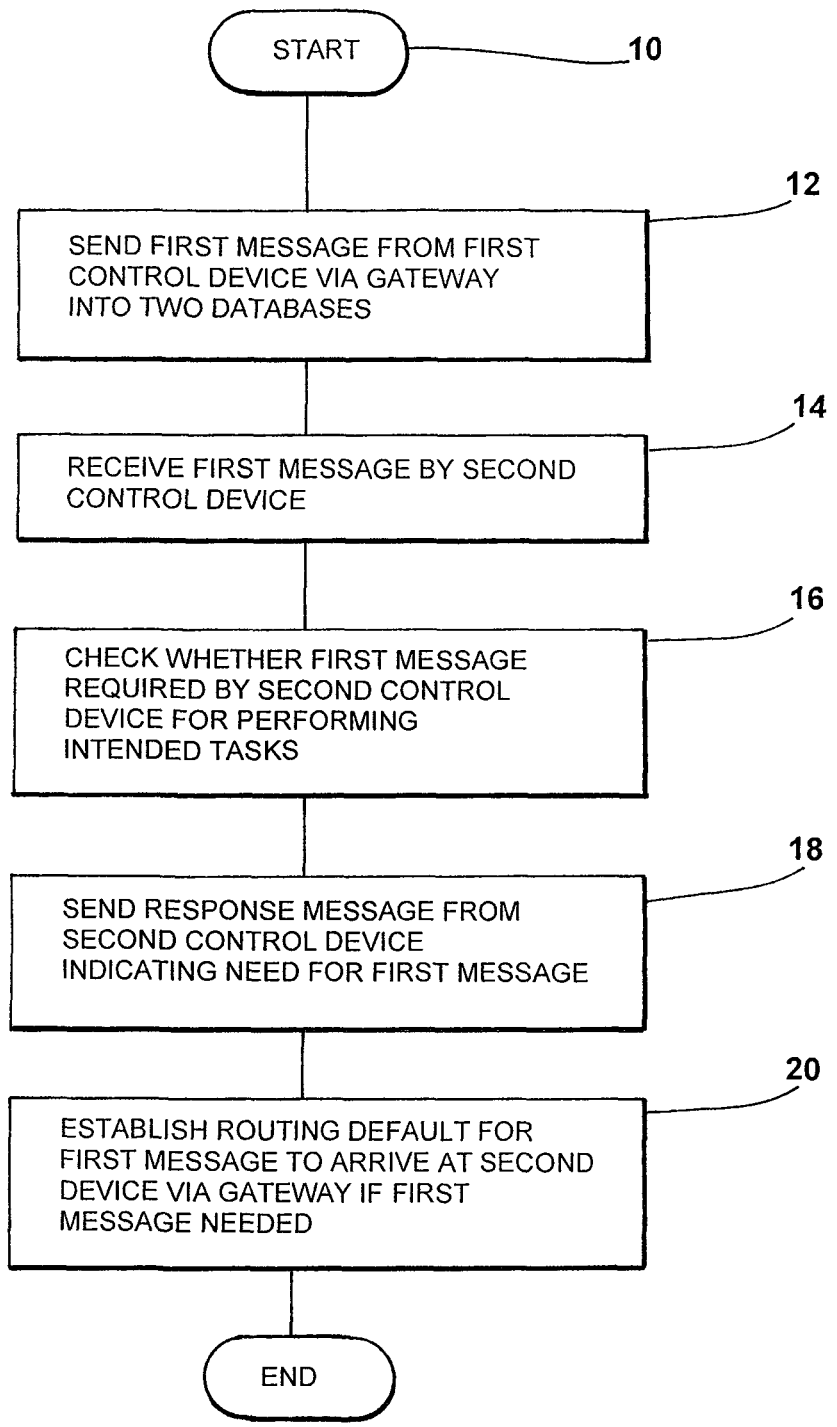

NETWORKING OF CONTROL DEVICES OF A MOTOR VEHICLE

CROSS-REFERENCE TO RELATED APPLICATIONS

This application is a continuation of PCT International Application No. PCT/EP2006/012035, filed Dec. 14, 2006, the entire disclosure of which is herein expressly incorporated by reference.

BACKGROUND AND SUMMARY OF THE INVENTION

The invention relates to a process for the networking of control devices in a motor vehicle, having at least two data buses, first sequence-controlled control devices being connected to a first data bus and second sequence-controlled control devices being connected to a second data bus, and first control devices exchanging messages on the basis of a routing default with second control devices by way of at least one gateway device.

Different data bus systems partly exist in known motor vehicles and, with respect to information technology, are connected by way of gateways or data interfaces between the data buses or data bus systems. The rules specifying which messages are transmitted into which data buses are stored in the gateways in so-called "routing tables". These routing tables are specified within the scope of the vehicle development and are specified in an invariable manner in the gateways.

It is an object of the invention to provide a more flexible process for the networking of control devices.

This object is achieved by a process for the networking of control devices in a motor vehicle, having at least two data buses, first sequence-controlled control devices being connected to a first data bus and second sequence-controlled control devices being connected to a second data bus, and first control devices exchanging messages on the basis of a routing default with second control devices by way of at least one gateway device. A first control device of the first or second control devices sends a first message via the gateway device into the at least two data buses, the first message preferably being that message which the first control device normally emits during the operation of the motor vehicle. A second control device of the first or second control devices receives the first message and checks whether the receiving and/or the processing of the first message is required for the corresponding control device in order to be able to carry out the tasks intended for it by way of its sequence control during the operation of the motor vehicle. The second control device sends out a response message, which at least indicates whether the second control device has a corresponding need to receive and/or process the first message. In the event of such a need, a routing default is established and/or an existing routing default is changed such that it causes the first message to arrive at the second control device from the first control device by way of the gateway device. Advantageous further developments are described herein.

Other objects, advantages and novel features of the present invention will become apparent from the following detailed description of one or more preferred embodiments when considered in conjunction with the accompanying drawing.

BRIEF DESCRIPTION OF THE DRAWING

The FIGURE is a flow chart illustrating an exemplary process for the networking of control devices in a motor vehicle in accordance with the invention.

DETAILED DESCRIPTION OF THE DRAWING

A process is provided for the networking of control devices in a motor vehicle having at least two data buses, of which first sequence-controlled control devices are connected to a first data bus and second sequence-controlled control devices are connected to a second data bus. First control devices exchange messages on the basis of a routing default with second control devices by way of at least one gateway device.

According to an exemplary embodiment of the invention as shown in the FIGURE, upon starting the process (step 10), a first control device of the first or second control devices sends a first message beyond the gateway device into the at least two data buses (step 12). The first message is preferably that message which the first control device normally emits during the operation of the motor vehicle.

At least a second control device of the first or second control devices receives the first message (step 14) and checks whether the receiving and/or the processing of the first message is required for the corresponding control device in order to be able to carry out the tasks intended for it by way of its sequence control during the operation of the motor vehicle (step 16). The second control device sends out a response message, which at least indicates whether the second control device has a corresponding need to receive and/or process the first message (step 18). In the event of such a need, a routing default is established and/or an existing routing default is changed in that it causes the first message to arrive at the second control device from the first control device by way of the gateway device (step 20).

In accordance with a preferred embodiment, it becomes possible to generate routing defaults, particularly routing tables, for individual vehicles. This preferably takes place in the vehicle, for example, at the end of the vehicle production, or after all control devices have been installed in the vehicle, after an exchange of control devices or the installation of an additional or a new control device, and/or after the change of the sequence control of at least one control device.

In a further preferred embodiment of the invention, it is provided that the inquiry concerning need is made by each control device of the first and second control devices. In addition, the inquiry concerning need is preferably made largely for every message of the respective control device capable of generating it. As a result, it becomes possible to initiate a complete networking of all control devices for arbitrary bus structures.

In an embodiment of the invention, it is provided that the second control device sends the response message at least to the first control device, and the first control device, the second control device, and/or the gateway device establishes the routing default, correspondingly changes or supplements an existing routing default, or causes its establishment and/or its corresponding change. As an alternative or in addition, a routing default device may be provided in the vehicle, which establishes the routing default, correspondingly changes or supplements an existing routing default, or causes its establishment and/or its corresponding change. In the case of a supplementing of the routing default, a firmly predetermined routing default may be combined with the routing default learned within the scope of the inquiry concerning need. As a result, the inquiry concerning need can be limited to those messages for which a firmly predetermined routing default has not yet been specified, whereby the initialization or learning operation can be accelerated. Messages for which no firm routing default has yet been specified may, for example, be messages oriented according to the country in which the vehicle is used.

In an embodiment of the invention, it is provided that the first control device will send the first message out again during the operation of the vehicle only when at least one other control device has informed the first control device of a corresponding need. As a result, it becomes possible to optimize the data exchange for the individual vehicle within the data buses of the vehicle during its operation in that data that is not required does not unnecessarily stress the data buses of the vehicle.

In a preferred embodiment of the invention, it is provided that the inquiry concerning need is made after the completion of the networking of the control devices within the scope of the vehicle manufacture.

In a further preferred embodiment of the invention, it is provided that the inquiry concerning need will be made again after the exchange of a control device and/or after the expansion of the networking by an additional control device and/or after the change of the sequence control of at least one control device, and the routing default is adapted correspondingly.

In an embodiment of the invention, it is provided that the routing default is stored at least in the gateway device, the routing default preferably being a routing table.

In an embodiment of the invention, it is provided that the routing default is stored in a non-volatile, re-writable memory, such as in particular an NV-RAM (non-volatile random access memory). As a result, it becomes possible to adapt the routing default to the requirements of the concrete vehicle at the relevant point-in-time.

An advantageous data bus system of a motor vehicle is also provided, in which the data bus system or its control devices has or have at least one sequence control which causes the implementation of the process according to the invention. Additionally, a computer program product is provided for a networked control device or for a data bus system of a motor vehicle, in the case of which at least one sequence control prompts the implementation of the process according to the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for networking control devices in a motor vehicle, having at least two data buses, of which first sequence-controlled control devices are connected to a first data bus and second sequence-controlled control devices are connected to a second data bus, wherein the first data bus is connected to the second data bus by at least one gateway device, the first control devices exchanging messages with the second control devices via the at least one gateway device based on a routing default, wherein the routing default comprising a routing table stored by the gateway device, the method comprising the acts of:

sending a first message from a first control device of the first or second control devices via the gateway device into the at least two data buses, the first message being a message normally emitted by the first control device during operation of the motor vehicle;

receiving the first message by a second control device of the first or second control devices, and checking whether the received first message is required for the second control device to carry out intended tasks of the second control device during operation of the motor vehicle;

sending a response message by the second control device to the first control device indicating at least a result of said checking; and in response to the response message indicating that the first message is required for the second control device to carry out intended tasks of the second control device during operation of the motor vehicle, affecting the routing default that causes the first message, when sent again by the first control device during operation of the motor vehicle, to arrive at the second control device, and in response to the response message indicating that the first message is not required for the second control device to carry out intended tasks of the second control device during operation of the motor vehicle, affecting the routing default so that the first message, when sent again by the first control device during operation of the motor vehicle, does not arrive at the second control device.

2. The process according to claim 1, wherein the act of affecting the routing default is performed by at least one of establishing a routing default and changing an existing routing default.

3. The process according to claim 1, wherein each control device of the first and second control devices determines whether the first message is required for it to carry out an intended task of the respective first and second control device during operation of the motor vehicle.

4. The process according to claim 3, wherein the determining that the first message is required to carry out intended tasks during operation of the motor vehicle is made substantially for every message of a respective control device capable of generating said message.

5. The process according to claim 3, further comprising the acts of:

sending the response message from the second control device to at least the first control device; and affecting the routing default by way of at least one of the first control device, the second control device, and the gateway device.

6. The process according to claim 3, wherein said sending the first message is performed after completion of a networking of the control device during a manufacture of the motor vehicle.

7. The process according to claim 6, wherein said sending the first message is performed again after at least one of an exchange of a control device, an expansion of the networking via an additional control device, and a change of sequence control of at least one control device, whereby the routing default is adapted correspondingly.

8. The process according to claim 1, wherein the determining that the first message is required to carry out intended tasks during operation of the motor vehicle is made substantially for every message of a respective control device capable of generating said message.

9. The process according to claim 1, further comprising the acts of:

sending the response message from the second control device to at least the first control device; and affecting the routing default by way of at least one of the first control device, the second control device, and the gateway device.

10. The process according to claim 1, wherein the first control device sends out the first message again during operation of the motor vehicle in response to at least one other control device has informed the first control device of a corresponding need for the first message to carry out an intended task of the at least one other control device.

11. The process according to claim 1, wherein the routing default is stored in a non-volatile, re-writable memory.

12. The process according to claim 11, wherein said memory is an NV-RAM.

\* \* \* \* \*